(12) United States Patent
Smith

(10) Patent No.: US 10,947,015 B2
(45) Date of Patent: Mar. 16, 2021

(54) TAMPER EVIDENT CAP ASSEMBLY

(71) Applicant: GlaxoSmithKline Consumer Healthcare (UK) IP Limited, Brentford (GB)

(72) Inventor: Nicholas Smith, Brentwood (GB)

(73) Assignee: GlaxoSmithKline Consumer Healthcare (UK) IP Limited, Brentford (GB)

( * ) Notice: Subject to any disclaimer, the term of this patent is extended or adjusted under 35 U.S.C. 154(b) by 152 days.

(21) Appl. No.: 16/307,565

(22) PCT Filed: Jun. 9, 2017

(86) PCT No.: PCT/IB2017/053427
§ 371 (c)(1),
(2) Date: Dec. 6, 2018

(87) PCT Pub. No.: WO2017/212454
PCT Pub. Date: Dec. 14, 2017

(65) Prior Publication Data
US 2019/0263569 A1  Aug. 29, 2019

Related U.S. Application Data

(60) Provisional application No. 62/347,932, filed on Jun. 9, 2016.

(51) Int. Cl.
*B65D 41/34* (2006.01)
*B65D 50/04* (2006.01)
(Continued)

(52) U.S. Cl.
CPC ....... *B65D 41/3433* (2013.01); *B65D 50/041* (2013.01); *B29C 45/2622* (2013.01); *B29C 45/4407* (2013.01)

(58) Field of Classification Search
CPC ............ B65D 50/02; B65D 41/3404; B65D 41/3433; B65D 50/041; B65D 41/04;
(Continued)

(56) References Cited

U.S. PATENT DOCUMENTS 4,529,096 A * 7/1985 Chartier ............. B65D 41/3452
215/250
4,598,833 A * 7/1986 Herr ..................... B65D 50/041
215/220
(Continued)

FOREIGN PATENT DOCUMENTS

EP        1923319 A1    5/2008
WO    WO 9729971 A1    8/1997
(Continued)

*Primary Examiner* — Kareen K Thomas
(74) *Attorney, Agent, or Firm* — Roshni A. Sitapara

(57) ABSTRACT

A tamper evident cap assembly includes an outer cap having an outer cap end wall and an outer cap skirt, and an inner cap having an inner cap end wall and an inner cap skirt. The inner cap skirt has a thread on an inner surface for selectively fastening the cap assembly on a portion of a container. The thread has separations therein. The first and second vertical ratchet teeth of the outer cap and the inner cap, respectively, abut when the outer cap is turned in an application direction to rotate the inner cap and the outer cap together to fasten the inner cap onto the container. When a downward force is applied on the outer cap, the second end teeth on the inner cap engage with the first end teeth on the outer cap applying torque on the outer cap in the removal direction turning the inner cap to release the cap assembly from the container and rupture the tamper evident band.

18 Claims, 16 Drawing Sheets

(51) Int. Cl.
*B29C 45/44* (2006.01)
*B29C 45/26* (2006.01)

(58) Field of Classification Search
CPC ............ B65D 41/0464; B65D 41/0457; B65D 41/08; B65D 41/34; B65D 41/38; B65D 45/30; B65D 45/325; B65D 50/00; B29C 45/4407; B29C 45/2622
USPC ....... 215/204, 220, 217, 218, 219, 223, 222; 220/254.1, 254.2, 254.4, 254.7, 254.8, 220/254.9, 256.1, 258.1, 258.3, 259.3
See application file for complete search history.

(56) References Cited

U.S. PATENT DOCUMENTS

| | | | | |
|---|---|---|---|---|
| 5,280,842 | A * | 1/1994 | Koo | B65D 50/041 215/220 |
| 5,402,901 | A * | 4/1995 | Carvalheiro | B29C 45/44 215/252 |
| 5,678,712 | A * | 10/1997 | Rios | B65D 50/041 116/308 |
| 5,782,369 | A | 7/1998 | Tansey | |
| 7,331,479 | B2 * | 2/2008 | Oh | B65D 41/0471 215/222 |
| 7,549,547 | B2 * | 6/2009 | Herr | B65D 55/022 215/220 |
| 8,056,742 | B2 * | 11/2011 | Brozell | B65D 50/041 215/220 |
| 8,474,634 | B1 * | 7/2013 | Branson | B65D 50/041 215/219 |
| 8,534,476 | B2 * | 9/2013 | Brozell | B65D 50/041 215/217 |
| 8,833,577 | B2 * | 9/2014 | Habibi-Naini | B65D 50/041 215/200 |
| 2002/0066713 | A1 | 6/2002 | Ma | |
| 2005/0150857 | A1 * | 7/2005 | Brozell | B65D 50/041 215/204 |
| 2009/0032486 | A1 * | 2/2009 | Brozell | B65D 50/041 215/220 |

FOREIGN PATENT DOCUMENTS

WO    WO 0034133 A2    6/2000
WO    WO 015052671 A1    4/2015

* cited by examiner

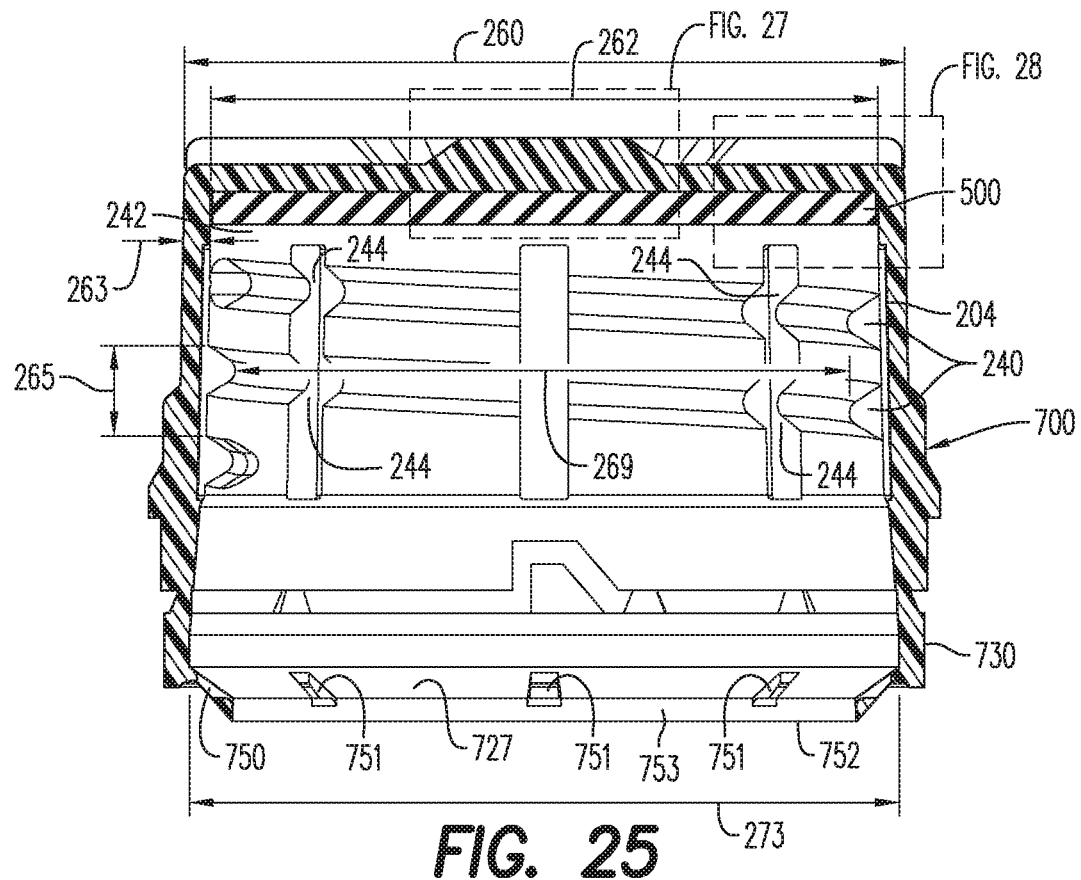
FIG. 25
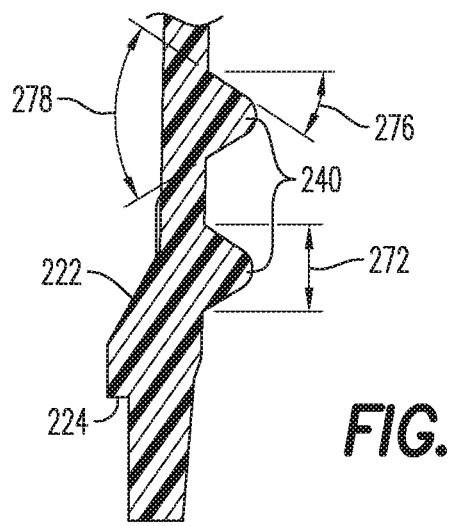
FIG. 26
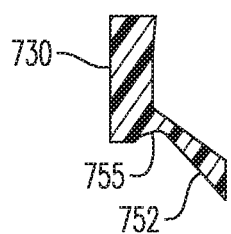

TAMPER EVIDENT CAP ASSEMBLY

This application is a 371 of International Application No. PCT/IB2017/053427, filed Jun. 9, 2017, which claims the benefit of U.S. Provisional Application No. 62/347,932, filed Jun. 9, 2016, which is incorporated herein in its entirety.

BACKGROUND OF THE DISCLOSURE

1. Field of the Disclosure

The present disclosure relates generally to container caps. More particularly, the present disclosure relates to a child resistant tamper evident cap assembly for a container.

2. Description of Related Art

Child safety caps that close containers can include inner and outer caps. The inner and outer caps have ratchet teeth formed on the skirts thereof for turning and connecting the inner cap on the container when torque is applied to the outer cap in the application direction. When the outer cap is turned in the removal direction, however, the ratchet teeth on the outer cap slide over the ratchet teeth on the inner cap without turning the inner cap. To remove the child safety cap from the container, it is necessary to exert sufficient downward force on the outer cap for interlocking horizontally and radially extending teeth on the outer cap with teeth on the inner cap, so that when a torque is simultaneously applied to the outer cap in the removal direction, the inner cap will be turned for removal from the container.

Child safety caps generally have a threaded closure on the inner cap and container. The threads on the inner cap can have quality issues during molding such as the thread on the inner cap tending to roll, for example, creating flat spots in the thread, creases in the thread, or stripping the thread off the cap entirely.

Further, some caps have included tamper evident bands. However, quality issues also accompany this configuration. Such quality problems can include the tamper evident band breaking away from the rest of the cap during manufacture of cap assembly. One attempted solution to avoid such premature breaking of the tamper evident band requires the use of different materials for each of the tamper evident band, the inner cap that the tamper evident band is directly connected to and breaks away from, and the outer cap. However, use of different materials adds to cost and complicates manufacture of the cap. Another attempted solution requires the tamper evident band to be positioned up inside of the cap. However, the tamper evident band is obscured by the cap so that evidence of tampering is not easily detected.

Accordingly, there is a need for a cap assembly that overcomes the above deficiencies.

SUMMARY OF THE DISCLOSURE

The present disclosure provides a cap assembly that maintains the integrity of the tamper evident band before use by the consumer.

The present disclosure also provides a cap assembly having a tamper evident band in which the cap assembly having the tamper evident band are made only of two materials.

The present disclosure further provides such a cap assembly that reduces or avoids the creation of flat spots, stripping and creases in the thread of the cap.

The present disclosure still further provides such a cap assembly that has an inner cap including a tamper evident band positioned below an inner cap skirt to reduce or eliminate the tamper evident band breaking away from the rest of the cap assembly during manufacture of cap assembly.

The present disclosure further provides such a cap assembly in which during manufacturing there is a zero or virtually zero percent of breakage of the inner cap and the tamper evident band during connection of the cap assembly to a container.

The present disclosure yet further provides such a cap assembly that has an inner cap including a tamper evident band positioned below an inner cap skirt to reduce or eliminate the tamper evident band breaking away from the rest of the cap assembly during connection of the cap assembly to a container.

The present disclosure further provides a cap assembly that includes an outer cap having an outer cap end wall and an outer cap skirt, and an inner cap having an inner cap end wall and an inner cap skirt. The inner cap skirt has a thread on an inner surface for selectively fastening the cap assembly on a portion of a container. The thread has a plurality of separations therein.

The present disclosure still further provides such a cap assembly in which the tamper evident band is connected to the inner cap skirt by a plurality of breakable bridges, and at least one of the plurality of bridges is aligned with one of the plurality of separations in the thread.

The above-described and other advantages and features of the present disclosure will be appreciated and understood by those skilled in the art from the following detailed description, drawings, and appended claims.

BRIEF DESCRIPTION OF THE DRAWINGS

FIG. 25 is a cross-sectional view of the inner cap of FIG. 19 taken along A-A of FIG. 23.

FIG. 26 is a partial cross-sectional view of the inner cap of FIG. 19 taken along B-B of FIG. 24.

DETAILED DESCRIPTION OF THE DISCLOSURE

Figure 1:
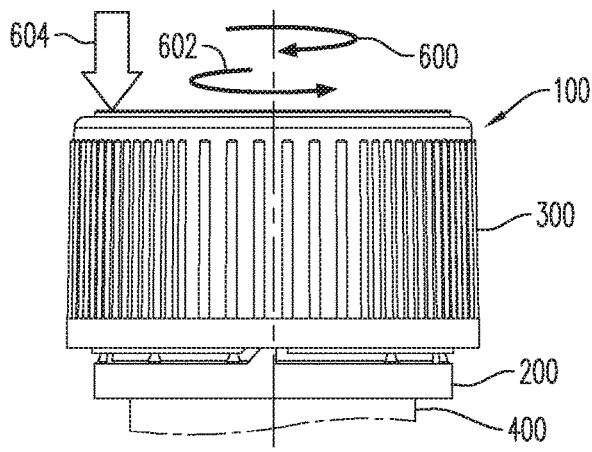
FIG. 1 is a front view of an embodiment of a cap assembly according to the present disclosure.

Referring to the drawings, and in particular to FIG. 1, an exemplary embodiment of a cap assembly of the present disclosure is generally referred to by reference numeral 100. Cap assembly 100 has an inner cap 200 and an outer cap 300 that covers a portion of inner cap 200. Cap assembly 100 is selectively connectable to a container 400.

Figure 2:
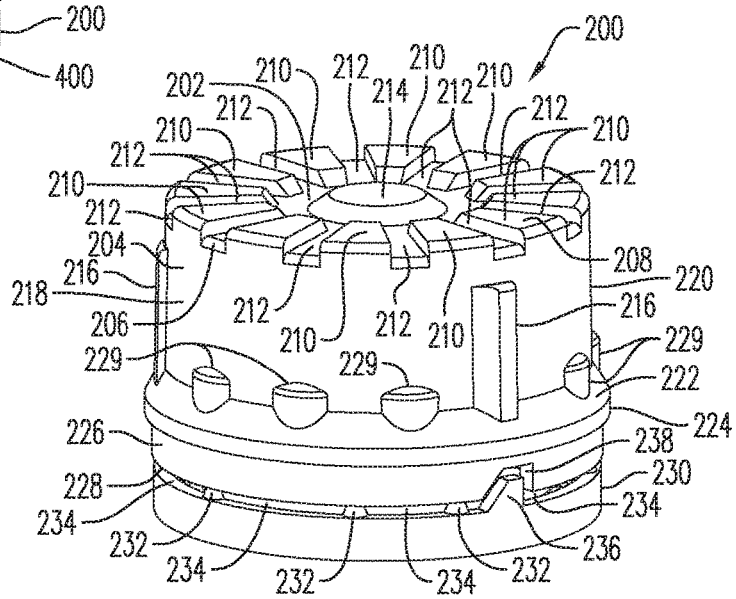
FIG. 2 is a top front perspective view of an inner cap of the cap assembly of FIG. 1.

Referring to FIG. 2, inner cap 200 has an inner cap end wall 202 and an inner cap skirt 204 joined at an outer edge 206. Inner cap end wall 202 has an upper surface 208. Inner cap end wall 202 has end teeth 210 extending from upper surface 208. Between two of teeth 210 forms a slot 212. Inner cap end wall 202 has a protuberance 214. Inner cap 200 has vertical ratchet teeth 216 on an outer surface 218 of inner cap skirt 204. Inner cap skirt 204 has a cylindrical portion 220. A taper portion 222 extends from cylindrical portion 220. Taper portion 222 tapers outward to form a ridge 224. A peripheral portion 226 extends from ridge 224 to a skirt edge 228. Inner cap skirt 204 has bulges 229. Each bulge 229 is on cylindrical portion 220 and taper portion 222. Skirt edge 228 is connected to a tamper evident band 230 by bridges 232. Between two bridges 232 is a space 234. Tamper evident band 230 has a protrusion 236 that fits in a cutout 238 in inner cap skirt 204.

Figure 3:
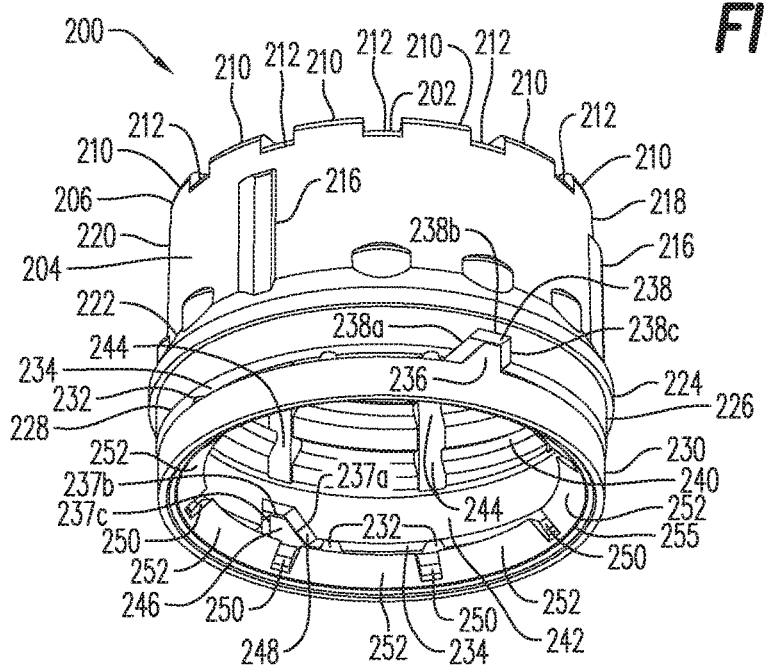
FIG. 3 is a bottom front perspective view of the inner cap of FIG. 2.

Referring to FIG. 3, inner cap skirt 204 has a thread 240 on an inner surface 242 for selectively fastening cap assembly 100 on a portion of a container 400. Thread 240 has separations 244 therein. Tamper evident band 230 has a protrusion 246 that fits in a cutout 248 in inner cap skirt 204 on a side opposite protrusion 236 and cutout 238. Tamper evident band 230 has gaps 250. Two gaps 250 form one finger 252 therebetween. Fingers 252 are folded about a fold line 255. Each finger 252 is biased against container 400 in the folded position. Each gap 250 is aligned with one separation 244 in thread 240. Each of bridges 232 or protrusions 236, 246 can also be aligned with one separation 244 in thread 240. Protrusions 236, 246 and cutouts 238, 248 have a complementary "shark tooth" shape. Protrusions 236, 246 have a ramp side 237a, a flat top 237b and a vertical side 237c. Cutouts 238, 248 have a ramp side 238a, a flat top 238b and a vertical side 238c.

Figure 4:
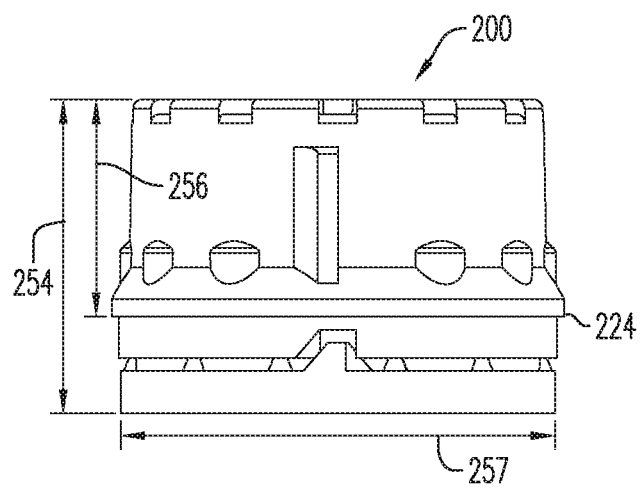
FIG. 4 is a front view of the inner cap of FIG. 2.
Figure 5:
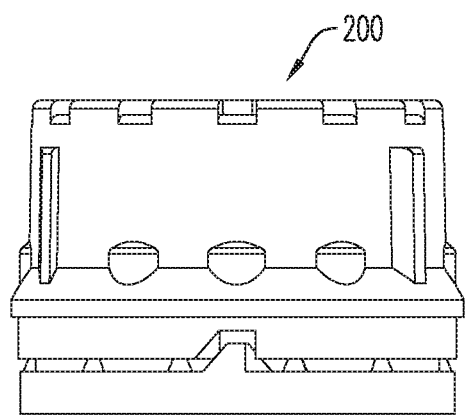
FIG. 5 is a rear view of the inner cap of FIG. 2.

Referring to FIGS. 4 and 5, inner cap 200 has a height 254 of, preferably, about 22.1 millimeters ("mm"). Inner cap 200 has a height 256 from teeth 210 to ridge 224 of, preferably, about 15.3 mm. Inner cap 200 has a width 257 of, preferably, about 31.2 mm.

Figure 6:
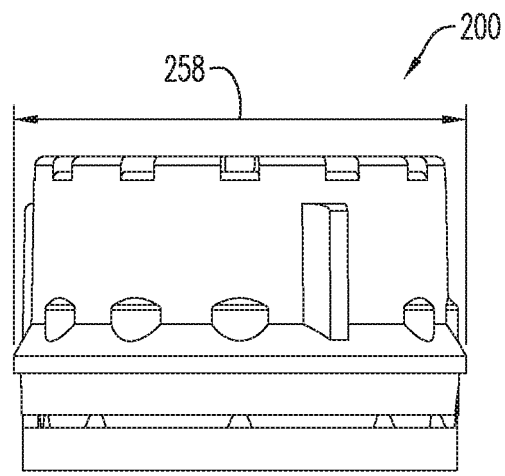
FIG. 6 is a side view of the inner cap of FIG. 2.
Figure 7:
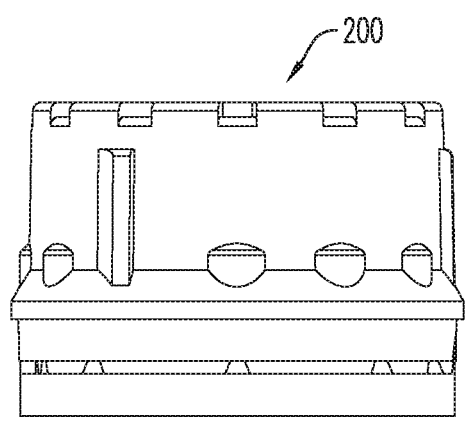
FIG. 7 is a side view of the inner cap of FIG. 2 rotated 180 degrees from FIG. 6.

Referring to FIGS. 6 and 7, inner cap 200 has a width 258 of, preferably, about 31.9 mm.

Figure 8:
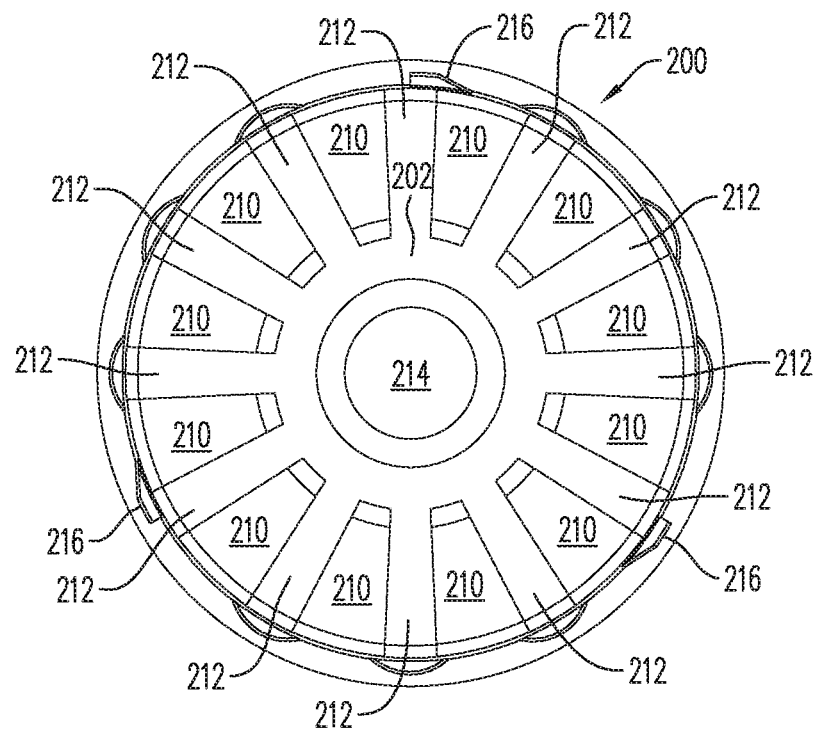
FIG. 8 is a top view of the inner cap of FIG. 2.

Referring to FIG. 8, teeth 210 and slots 212 extend about the circumference of inner cap end wall 202.

Figure 9:
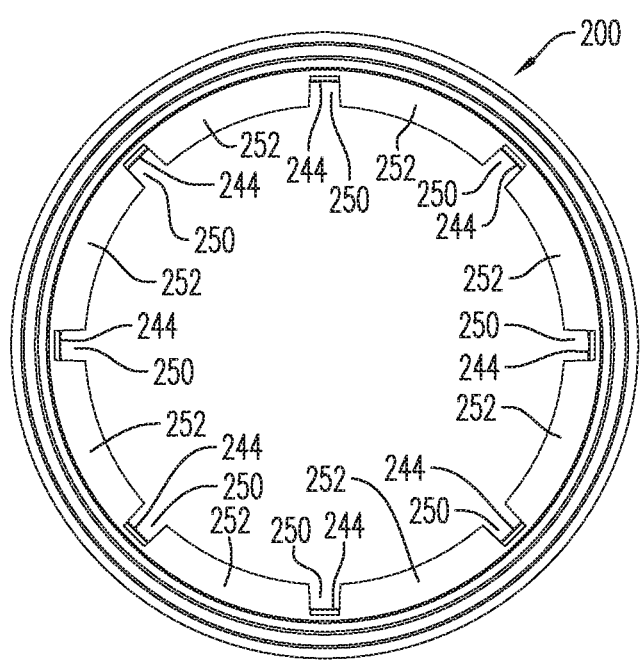
FIG. 9 is a bottom view of the inner cap of FIG. 2.

Referring to FIG. 9, gaps 250 and fingers 252 extend about the circumference of tamper evident band 230. As discussed above, each gap 250 is aligned with one separation 244 in thread 240. Gaps 250 are uniformly distributed around the circumference of tamper evident band 230.

Figure 10:
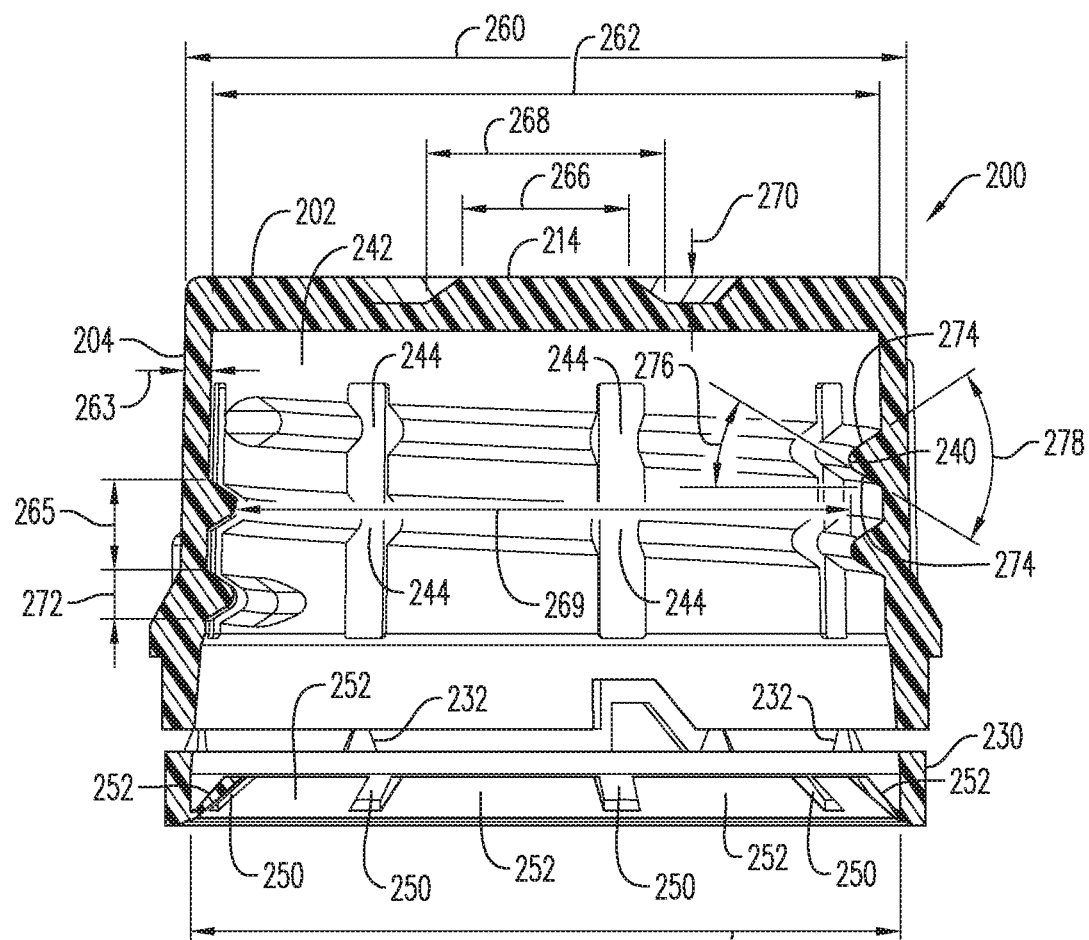
FIG. 10 is a cross-sectional view of the inner cap of FIG. 2.

Referring to FIG. 10, inner cap end wall 202 has a width 260 of, preferably, about 29.3 mm. Inner surface 242 of inner cap skirt 204 has a width 262 of, preferably, about 27.3 mm, and a thickness 263 of, preferably, about 1.1 mm. Protuberance 214 has an inner width 266 of, preferably, about 7.0 mm, an outer width 268 of, preferably, about 10 mm, and a height 270 of, preferably, about 1.0 mm. Thread 240 has a height 272 of, preferably, about 1.9 mm, sides 274 having an angle 276 with inner surface 242 of, preferably, about 30 degrees. Sides 274 of thread 240 have an angle 278 therebetween of, preferably, about 60 degrees. Thread 240 has threads each with a pitch 265 of, preferably, about 3.63 mm. Inner surface 242 has a width 269 within thread 240 of, preferably, about 25.7 mm. Tamper evident band 230 has an inner diameter 273 of, preferably, about 28.9 mm.

Figure 11:
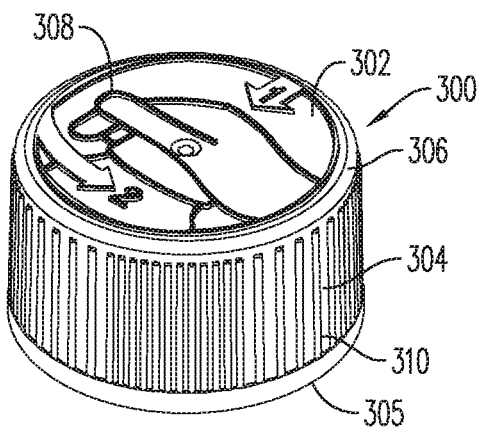
FIG. 11 is a top front perspective view of an outer cap of the cap assembly of FIG. 1.

Referring to FIG. 11, outer cap 300 has an outer cap end wall 302. Outer cap end 302 wall has an outer edge 306 connected to an outer cap skirt 304. Outer cap skirt 304 has a free edge 305 on a side opposite outer edge 306. Outer cap end 302 has indicia 308. Indicia 308 indicates use of cap assembly 100. Outer cap skirt 304 has gripping ribs 310 for gripping.

Figure 13:
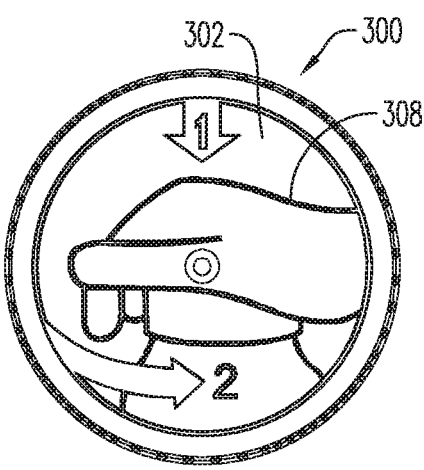
FIG. 13 is a top view of the outer cap of FIG. 11.
Figure 12:
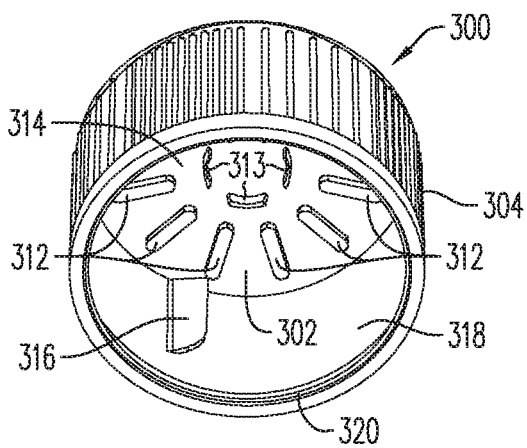
FIG. 12 is a bottom front perspective view of the outer cap of FIG. 11.

Referring to FIGS. 12-13, outer cap 300 has end teeth 312 and projections 313 extending from an inner surface 314 of outer cap end wall 302. Outer cap 300 has vertical ratchet teeth 316 on an inner surface 318 of outer cap skirt 304. Outer cap 300 has a rib 320 on an inner surface 318 of outer cap skirt 304.

Figure 14:
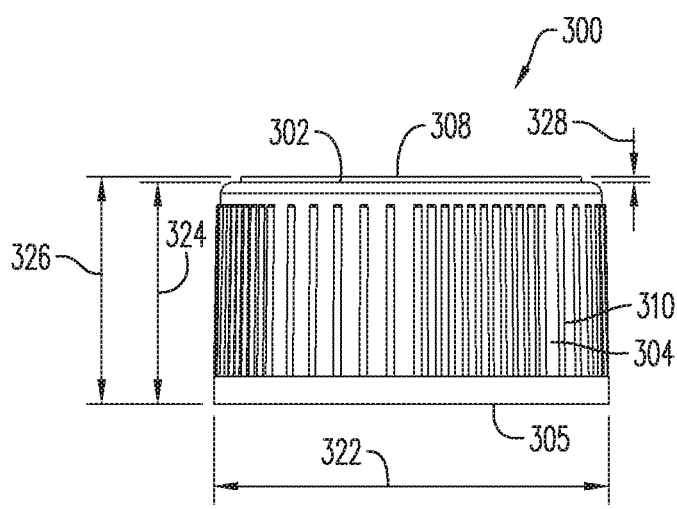
FIG. 14 is a front view of the outer cap of FIG. 11.

Referring to FIG. 14, outer cap 300 has a width 322 of, preferably, about 35.6 mm. Outer cap skirt 304 has a height 324 of, preferably, about 20.0 mm. Outer cap skirt 304 has a height 326 with indicia 308 of, preferably, about 20.5 mm. Indicia 308 has a height 328 of, preferably, about 0.5 mm.

Figure 15:
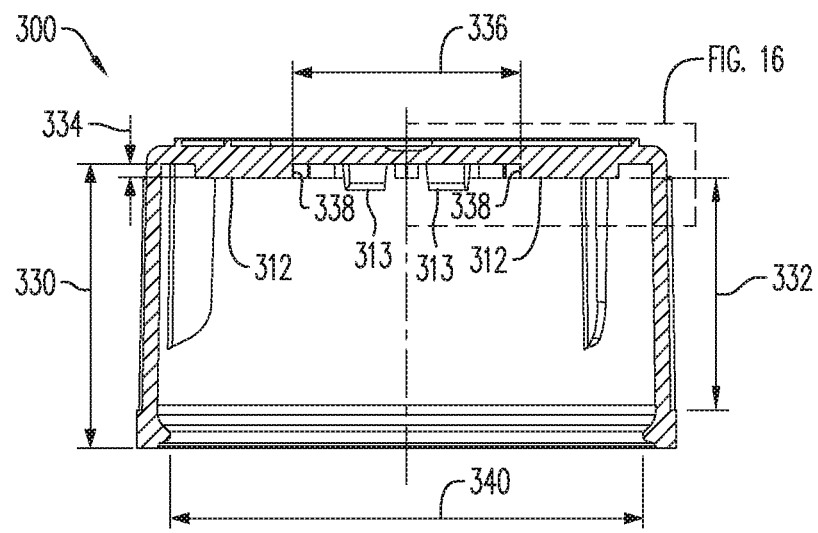
FIG. 15 is a cross-sectional view of the outer cap of FIG. 11.

Referring to FIG. 15, inner surface 318 has a height 330 between outer cap end wall 302 and free edge 305 of, preferably, about 18.8 mm. Inner surface 318 has a height 332 between outer cap end wall 302 and rib 320 of, preferably, about 16.3 mm. Teeth 312 have a height 334 of, preferably, about 0.9 mm. Teeth 312 has a length 336 between inner ends 338 of two of teeth 312 of, preferably, about 15 mm. Rib 320 has an inner diameter 340 of, preferably, about 31.2 mm.

Figure 16:
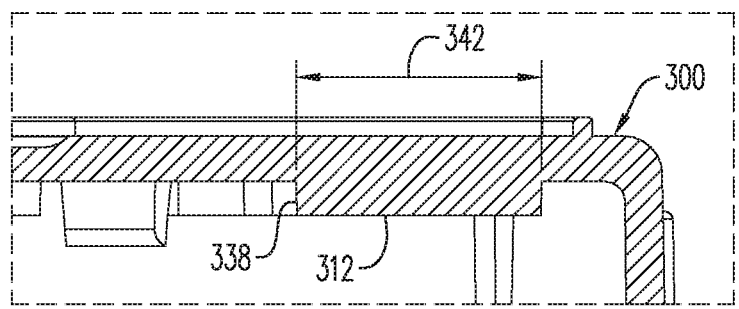
FIG. 16 is a partial cross-sectional view of the outer cap of FIG. 11 within the dashed portion of FIG. 15.

Referring to FIG. 16, each tooth 312 has a length 342 between outer cap end wall 302 and outer edge 306 of, preferably, about 6.5 mm.

Figure 17:
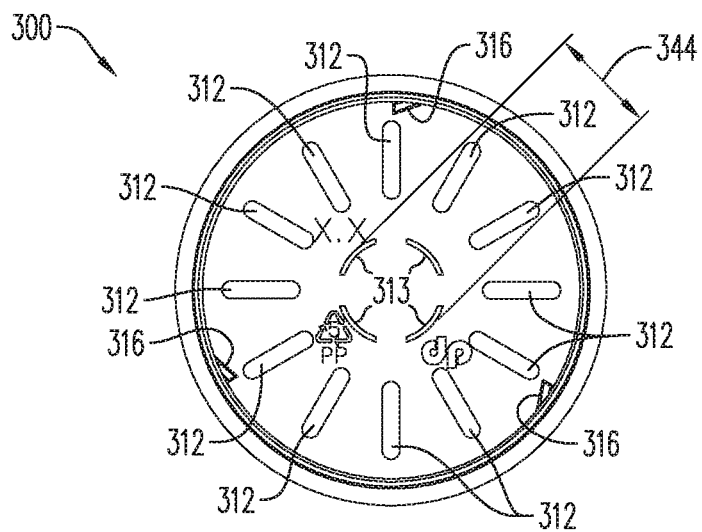
FIG. 17 is a bottom view of the outer cap of FIG. 11.

Referring to FIG. 17, projections 313 are along a circle having a diameter 344 between outer cap end wall 302 and outer edge 306 of, preferably, about 9.0 mm.

Figure 18:
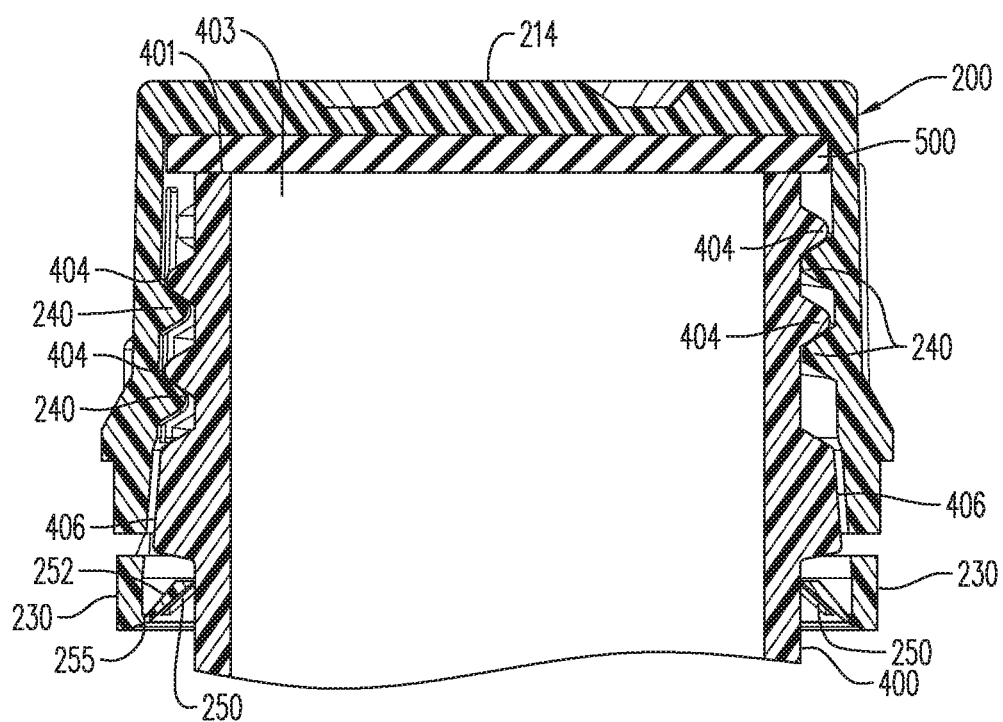
FIG. 18 is a cross-sectional view of the inner cap connected to a container.

Referring to FIGS. 1 and 18, outer cap 300 overlies inner cap 200 and is concentric therewith so that rib 320 of outer cap 300 is below ridge 224 of inner cap 200 connecting outer cap 300 and inner cap 200. A liner 500, shown in FIG. 18, is between inner cap 200 and a neck 401 of container 400 when inner cap 200 is connected to container 400 to seal opening 403 in container 400. Container 400 has threads 404 that mate with thread 240 to selectively fasten inner cap 200 and container 400 together. Fingers 252 of tamper evident band 230 are below a ledge 406. Fingers 252 are biased against container 400 in the folded position.

To connect or fasten inner cap 200 and container 400 together, vertical ratchet teeth 216 of inner cap 200 and vertical ratchet teeth 316 of outer cap 300 abut when outer cap 300 is turned in an application direction 600, shown in FIG. 1, to rotate inner cap 200 and outer cap 300 together to fasten inner cap 200 onto container 400 by threads 240 and 404. When inner cap 200 and container 400 are connected together, protuberance 214 of inner cap 200 engages projections 313 extending from inner surface 314 of outer cap end wall 302 and spaces, in a vertical direction, teeth 210 and teeth 312 from each other so that teeth 210 and teeth 312 pass over each other and do not interlock when outer cap 300 is turned in a removal direction 602 in absence of a predetermined downward force 604. Also, in absence of a predetermined downward force 604, vertical ratchet teeth 316 of outer cap 300 slide over vertical ratchet teeth 216 on inner cap 200 when outer cap 300 is turned in removal direction 602 so that outer cap 300 rotates and inner cap 200 does not rotate maintaining the connection between inner cap 200 and container 400.

When predetermined downward force 604 is applied on outer cap 300, teeth 210 on inner cap 200 engage and interlock with teeth 312 on outer cap 300 to apply torque on outer cap 300 in removal direction 602 turning both inner cap 200 and outer cap 300 in removal direction 602 to disengage thread 240 and threads 404 releasing cap assembly 100 from container 400. Upon disconnecting inner cap 200 from container 400, fingers 252 of tamper evident band 230 abut against ledge 406 of container, and upon application of a predetermined force in the removal direction 602, ramp side 238a of cutout 238, 248 in skirt edge 228 contacts ramp side 237a of tamper evident band 230 and the shape of ramp side 238a and ramp side 237a directs tamper evident band 230 away from skirt edge 228 so that bridges 232 are broken separating tamper evident band 230 from a remainder of inner cap 200.

Accordingly, cap assembly 100 has a safeguard for children because children are unable to manipulate cap assembly 100 in the required manner, in particular, to simultaneously apply predetermined downward force 604 and a force in the removal direction 602, to remove cap assembly 100 from container 400. Moreover, tamper evident band 230 being separated from a remainder of inner cap 200 indicates to a consumer that the container has been tampered with or cap assembly 100 has previously already been removed from container 400.

Inner cap 200 is molded with fingers 252 in an unfolded position (not shown). When a downward force is applied to inner cap 200, fingers 252 contact a neck edge 401 surrounding an opening 403 in container 400 folding fingers 252 about fold line 255 into a folded position, as shown in FIGS. 1-18, to connect inner cap 200 to container 400. Alternatively, fingers 252 can be folded to the folded position after molding and prior to connection to container 400.

Referring to FIGS. 19-28, an alternative to inner cap 200 is illustrated and generally referred to reference numeral 700. Inner cap 700 is the same as inner cap 200 except inner cap 700 has a different tamper evident band 730. Features that are the same for both inner cap 200 and inner cap 700 use the same reference numerals.

Figures 19, 20:
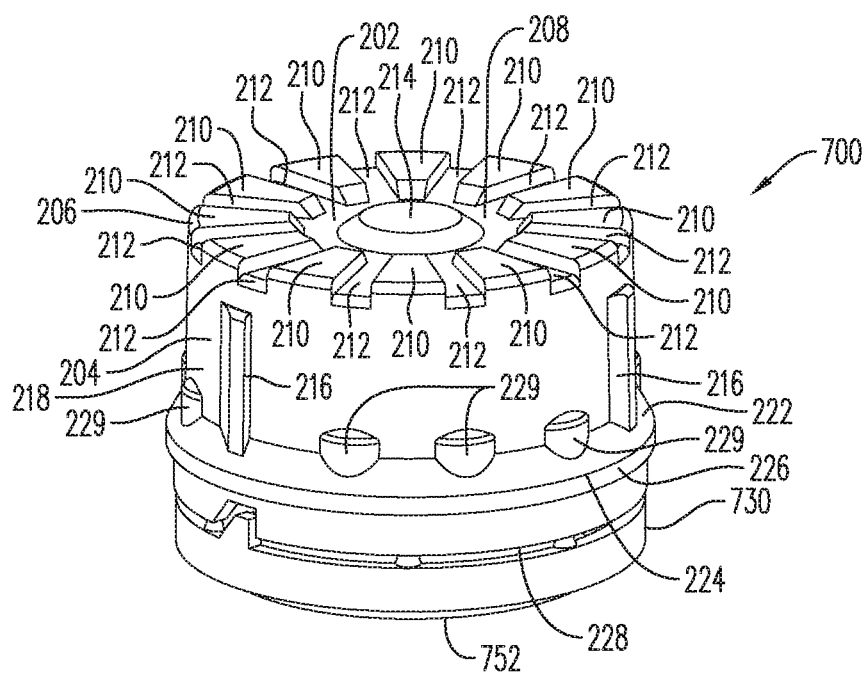
FIG. 19 is a top front perspective view of the inner cap of the cap assembly of FIG. 1 having a tamper evident band that is continuous.
FIG. 20 is a front view of the inner cap of FIG. 19.
Figure 21:
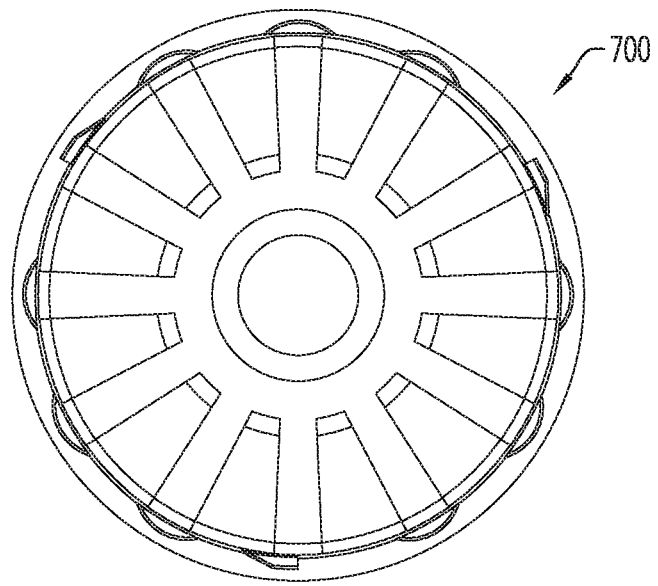
FIG. 21 is a top view of the inner cap of FIG. 19.
Figure 22:
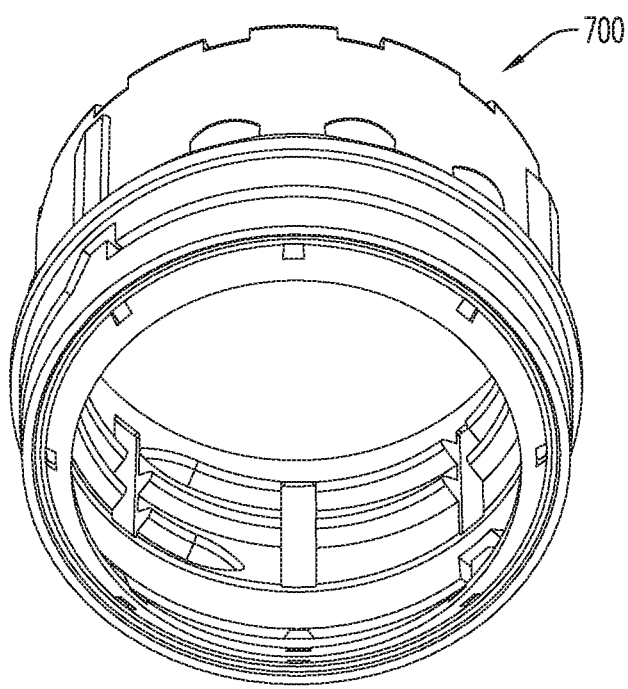
FIG. 22 is a bottom front perspective view of the inner cap of FIG. 19.
Figure 23:
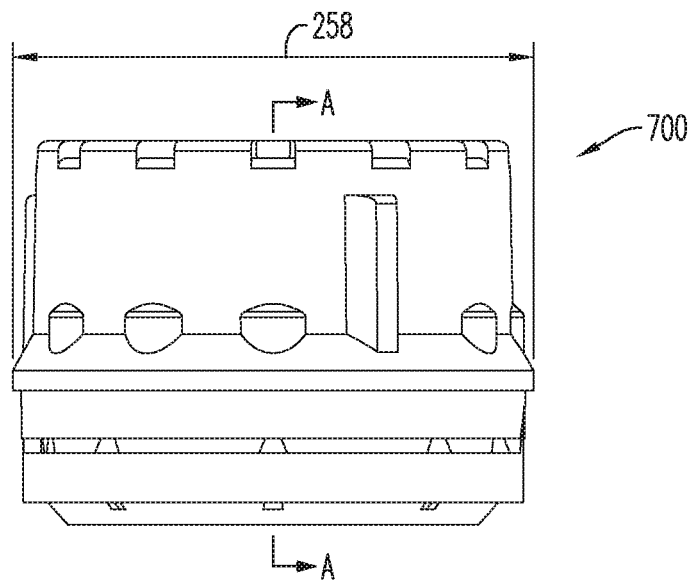
FIG. 23 is a side view of the inner cap of FIG. 19.
Figure 24:
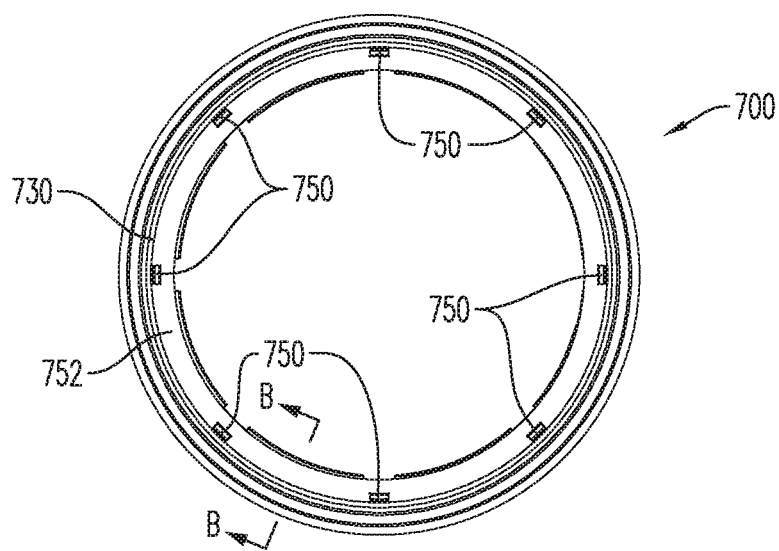
FIG. 24 is a bottom view of the inner cap of FIG. 19.
Figure 27:
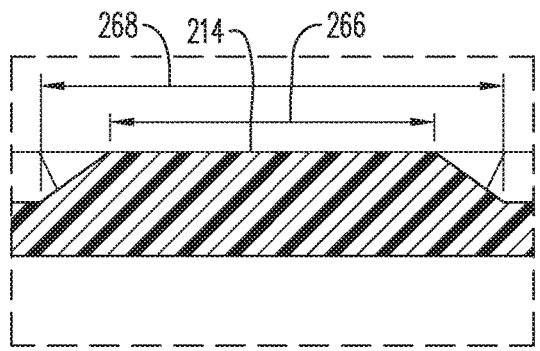
FIG. 27 is a partial cross-sectional view of the inner cap of FIG. 19 shown as DET-A in FIG. 25.
Figure 28:
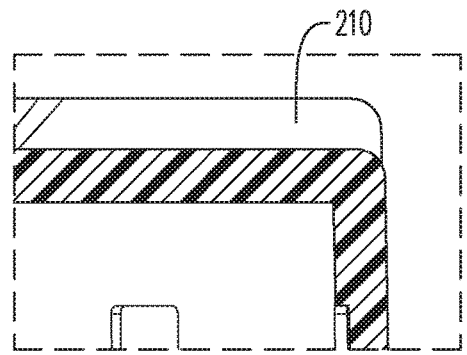
FIG. 28 is a partial cross-sectional view of the inner cap of FIG. 19 within the dashed portion of FIG. 25 on the top periphery of the inner cap.

Referring to FIG. 20, tamper evident band 730 is the same as tamper evident band 230 except tamper evident band 730 has a continuous flap 752 instead of fingers 252 and gaps 250. Features that are the same for both tamper evident band 230 and tamper evident band 730 use the same reference numerals. Flap 752 is continuous and does not have gaps 250. Flap 752 has an outer surface 726 with outer depressions 750.

Referring to FIG. 25, flap 752 has an inner surface 727 with inner depressions 751. Each one of inner depressions 751 is aligned with one of separations 244 in thread 240.

Figure 29:
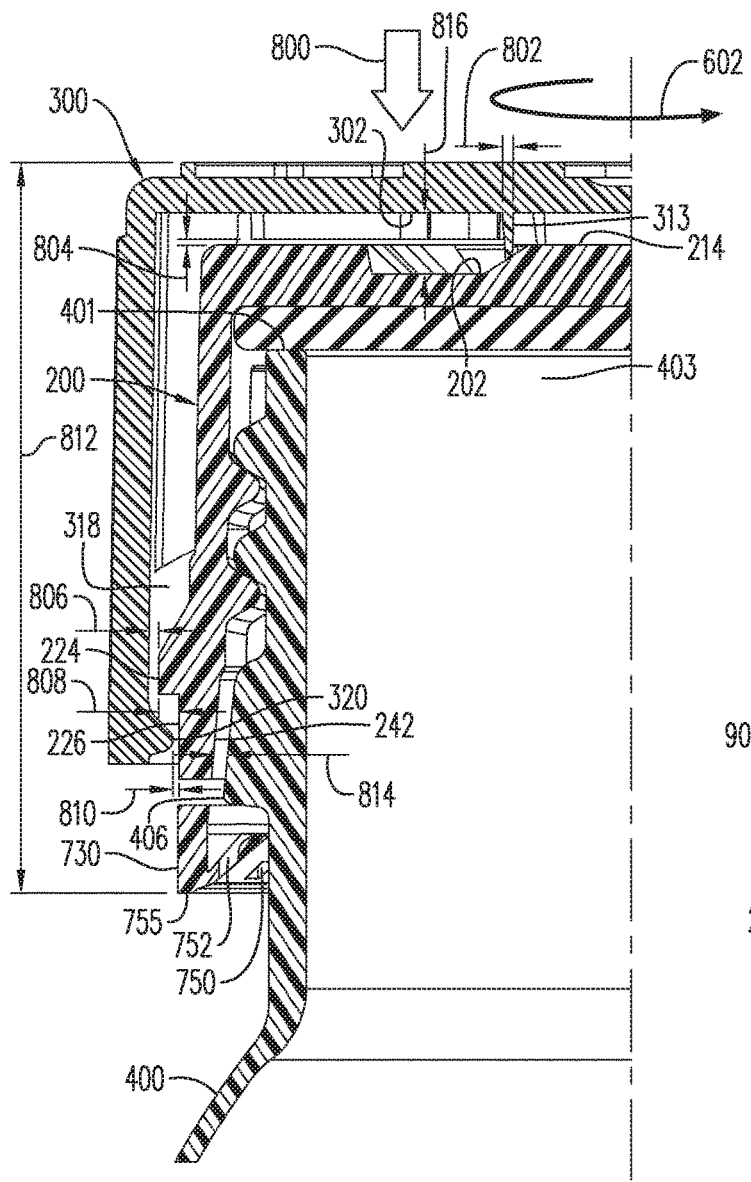
FIG. 29 is a cross-sectional view of the cap assembly of FIG. 1 having the inner cap of FIG. 19 and connected to a container.

Inner cap 700 is molded with flap 752 in an unfolded position as shown in FIGS. 19-28. When a downward force 800 is applied to inner cap 700, flap 752 contacts a neck edge 401 surrounding an opening 403 in container 400 folding flap 752 about a fold line 755 into a folded position, as shown in FIG. 29, to connect inner cap 700 to container 400. Alternatively, flap 752 can be folded to the folded position after molding and prior to connection to container 400. Flap 752 is biased against container 400 in the folded position. Similar to fingers 252, upon disconnecting inner cap 700 from container 400, flap 752 of tamper evident band 730 abuts against ledge 406 of container, and upon application of a predetermined force in the removal direction 602, ramp side 238a of cutout 238, 248 in skirt edge 228 contacts ramp side 237a of tamper evident band 230 and the shape of ramp side 238a and ramp side 237a directs tamper evident band 730 away from skirt edge 228 so that bridges 232 are broken separating tamper evident band 730 from a remainder of inner cap 700.

Referring to FIG. 29, projections 313 of outer cap 300 have a thickness 802 of, preferably, about 0.4 mm. Projections 313 and protuberance 214 form a space, in absence of a predetermined downward force 604, having a height 804 of, preferably, about 0.2 mm. A space is between ridge 224 and inner surface 318 of outer cap skirt 304 having a width 806 of, preferably, about 0.4 mm. Ridge 224 has a width 808 of, preferably, about 0.7 mm. A space is between peripheral portion 226 and rib 320 of outer cap skirt 304 having a width 810 of, preferably, about 0.2 mm. A height 812 from indicia 308 of outer cap 300 to fold line 255, 755 is, preferably, about 24.9 mm. A space is between inner surface 242 and ledge 406 having a width 814 of, preferably, about 0.5 mm. A space is between inner cap end wall 202 and outer cap end wall 302 having a height 816 of, preferably, about 2.1 mm.

Referring to FIGS. 31-42, the inner cap illustrated is a second embodiment of the inner cap of the cap assembly of the present disclosure. This inner cap is referred to as reference numeral 3100. Inner cap 3100 is the same as inner cap 700, except inner cap 3100 has a cavity 3110 in each of teeth 210, and outer depressions 1350 and inner depressions 1351 that are different than outer depressions 750 and inner depressions 751. Also, protuberance 214 has an outer depression 3102 and an inner depression 3104, and a width 1358 that is larger than width 258. The remaining features are the same for both inner caps 200, 700 and inner cap 3100 use the same reference numerals.

Figure 31:
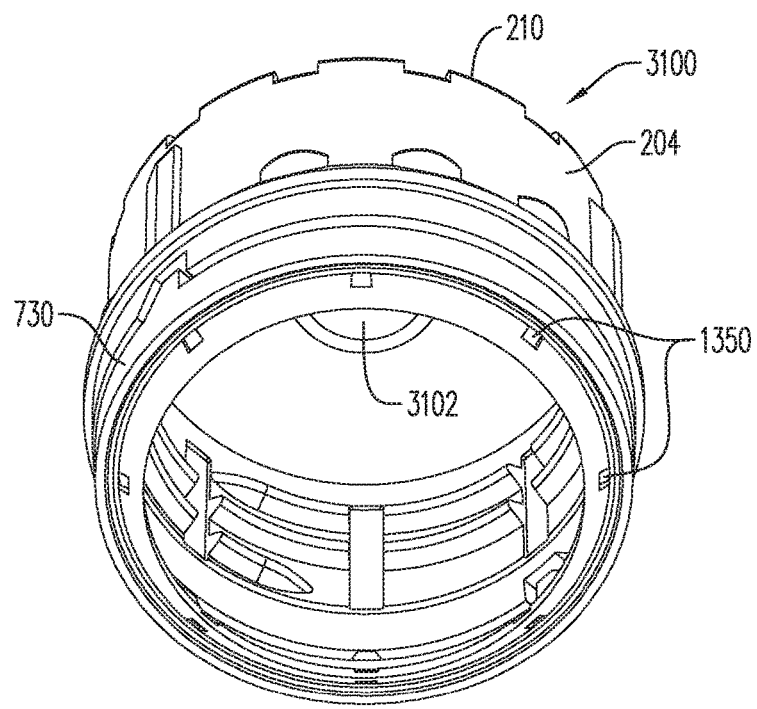
FIG. 31 is a bottom front perspective view of an inner cap that is modified from the inner cap of FIG. 19.
Figure 32:
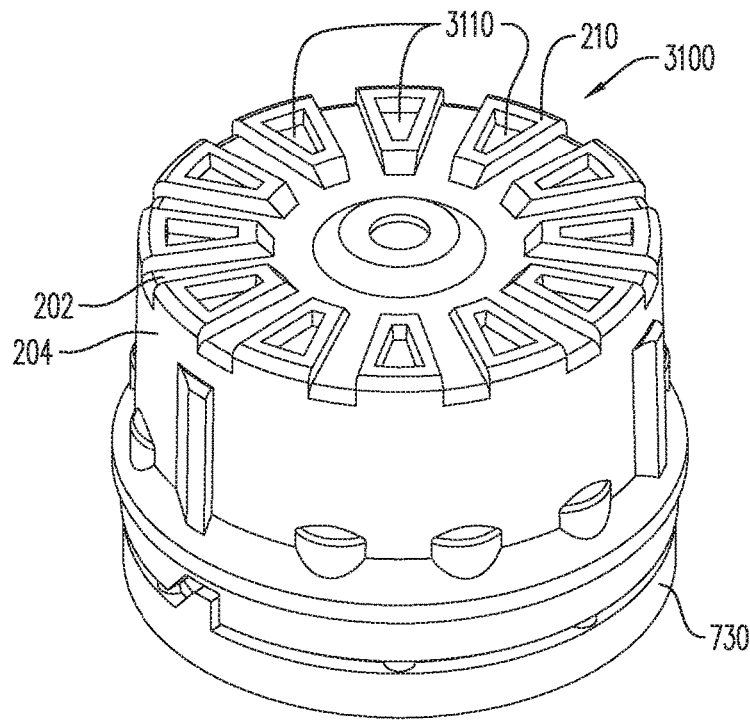
FIG. 32 is a top front perspective view of the inner cap of FIG. 31.
Figure 33:
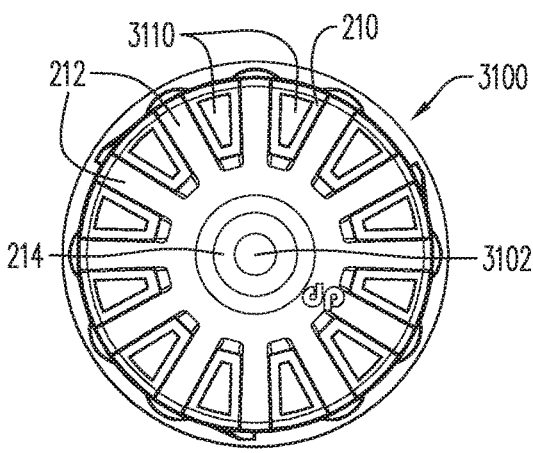
FIG. 33 is a top view of the inner cap of FIG. 31.
Figure 34:
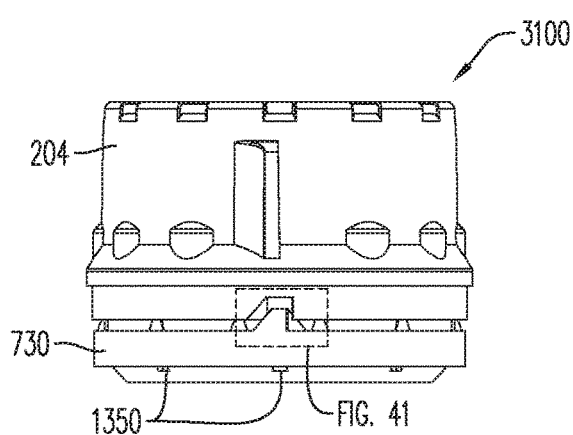
FIG. 34 is a side view of the inner cap of FIG. 31.

Referring to FIGS. 31-33, inner cap 3100 has cavity 3110 in each of teeth 210. Significantly, cavity 3110 saves on materials for forming teeth 210 that can result in cost savings. Alternatively, outer cap 300 can have a complementary shape extending from inner surface 314 of outer cap end wall 302. Outer cap 300 and inner surface 314 each are engageable with cavity 3110 to assist when predetermined downward force 604 is applied on outer cap 300. During the application of downward force 604, teeth 210 on inner cap 200 engage and interlock with teeth 312 on outer cap 300 to apply torque on outer cap 300 in removal direction 602 that results in turnings both inner cap 200 and outer cap 300 in removal direction 602 to disengage thread 240 and threads 404 releasing cap assembly 100 from container 400.

Referring to FIGS. 34-39, outer depressions 1350 and inner depressions 1351 are different than outer depressions 750 and inner depressions 751, respectively. Outer depressions 750 and inner depressions 751 extend from adjacent fold line 755 to a free end 753 of flap 752, whereas outer depressions 1350 and inner depressions 1351 extend from adjacent fold line 755 short of free end 753 of flap 752. Flap 752 can have an aperture that extends through each outer depression 750 through to one inner depression 751 that aligns therewith. Similarly, flap 752 can have an aperture that extends through each outer depression 1350 through to a respective inner depression 1351 that aligns therewith.

Figure 35:
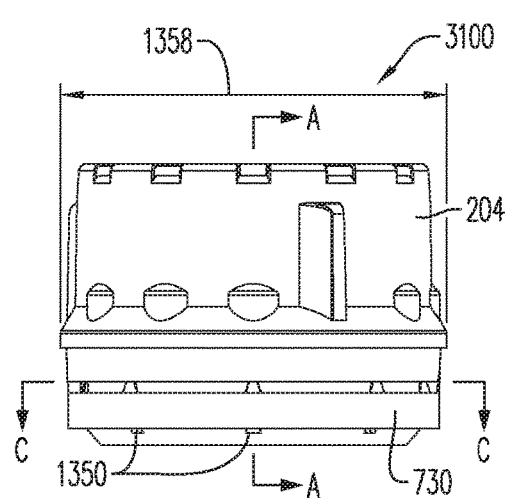
FIG. 35 is a front view of the inner cap of FIG. 31.
Figure 36:
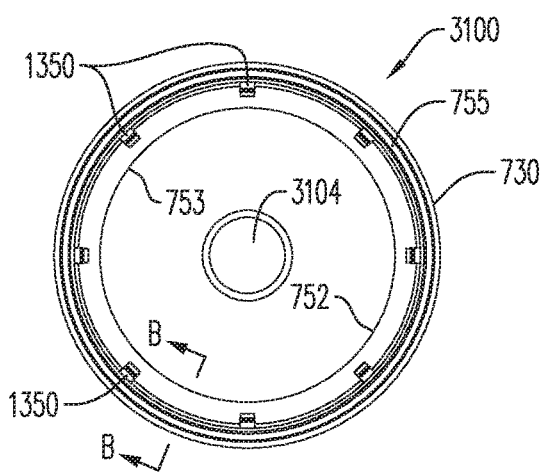
FIG. 36 is a bottom view of the inner cap of FIG. 31.
Figure 37:
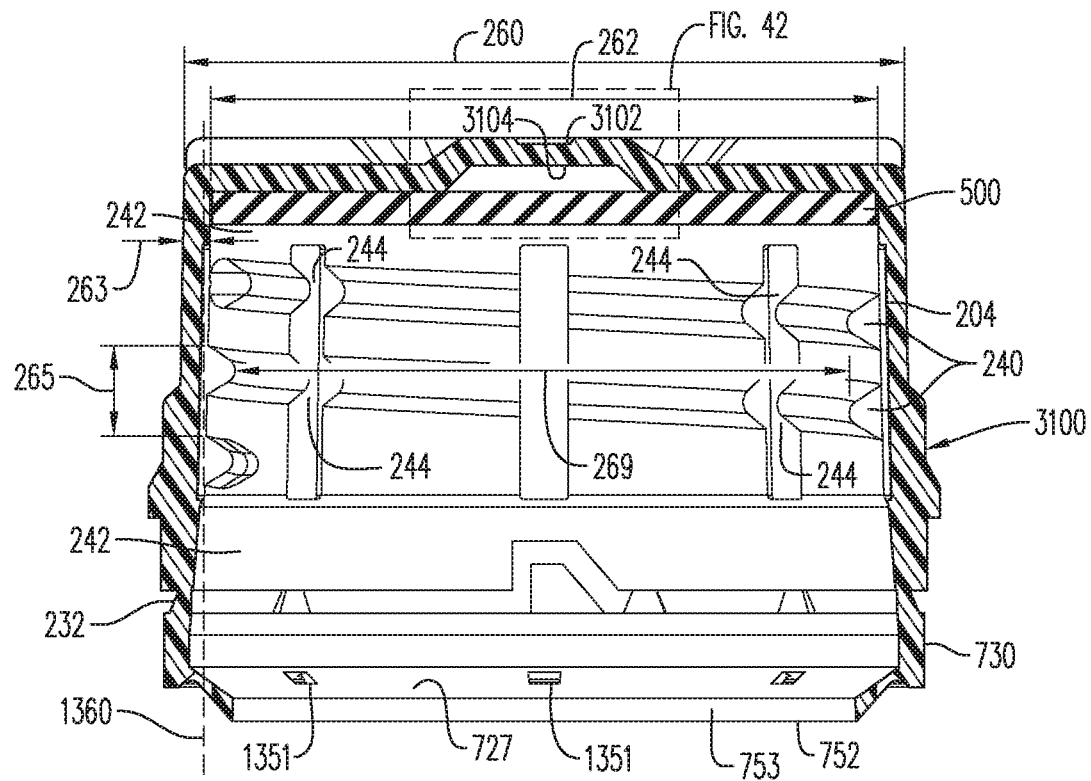
FIG. 37 is a cross-sectional view of the inner cap of FIG. 31 taken along B-B of FIG. 36.
Figure 38:
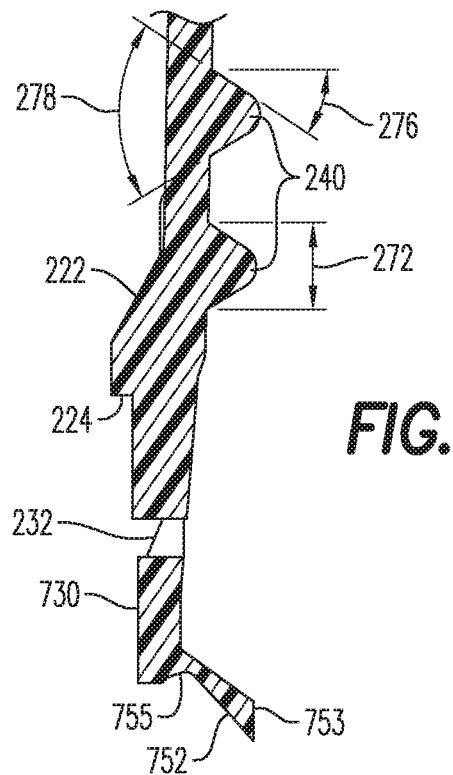
FIG. 38 is a partial cross-sectional view of the inner cap of FIG. 31 taken along B-B of FIG. 36.
Figure 39:
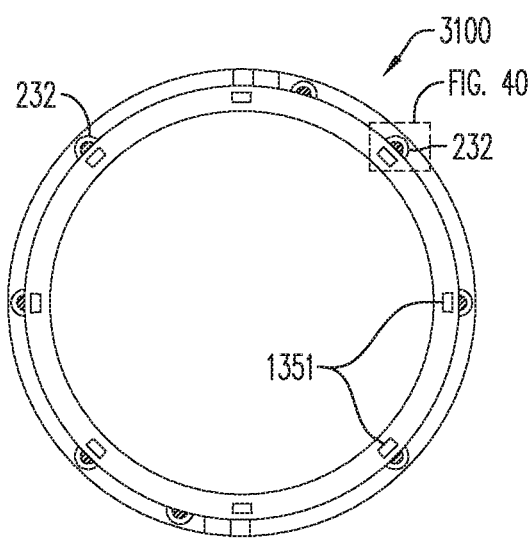
FIG. 39 is a cross-sectional view of the inner cap of FIG. 31 taken along C-C of FIG. 35.

Referring to FIG. 35, inner cap 3100 has a width 1358 of, preferably, about 32.2 mm.

Figure 40:
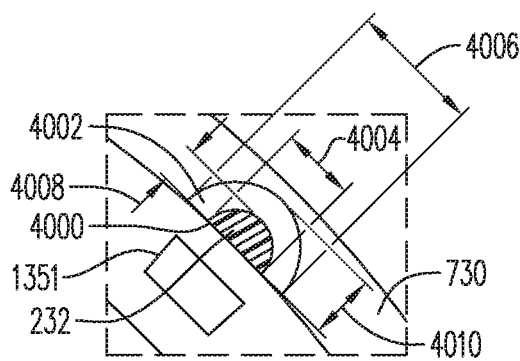
FIG. 40 is a partial cross-sectional view of the inner cap of FIG. 31 within the dashed portion of FIG. 39 referenced as DET-C.

Referring to FIG. 40, each bridge 232 has a shape that includes a flat side 4000 and a curved side 4002 with the curved surface increasing in size from skirt edge 228 to tamper evident band 730. Flat side 4000 has a width that increases from first width 4004 of 0.7 mm to a second width 4006 of 1.4 mm. Curved side 4002 has a maximum thickness that increases from a first maximum thickness 4008 of 0.4 to a second maximum thickness 4010 of 0.7.

Bridges 232 are breakable due to their shape, size and material. Each bridge 232 can break upon disconnecting inner cap 700 from container 400, when flap 752 of tamper evident band 730 abuts against ledge 406 of container and upon application of a predetermined force in the removal direction 602. Upon application of the predetermined removal force 602, ramp side 238a of cutout 238, 248 in skirt edge 228 contacts ramp side 237a of tamper evident band 230 and the shape of ramp side 238a and ramp side 237a directs tamper evident band 730 away from skirt edge 228 so that some or all of bridges 232 are broken to separate tamper evident band 730 from the remainder of inner cap 700.

Figure 41:
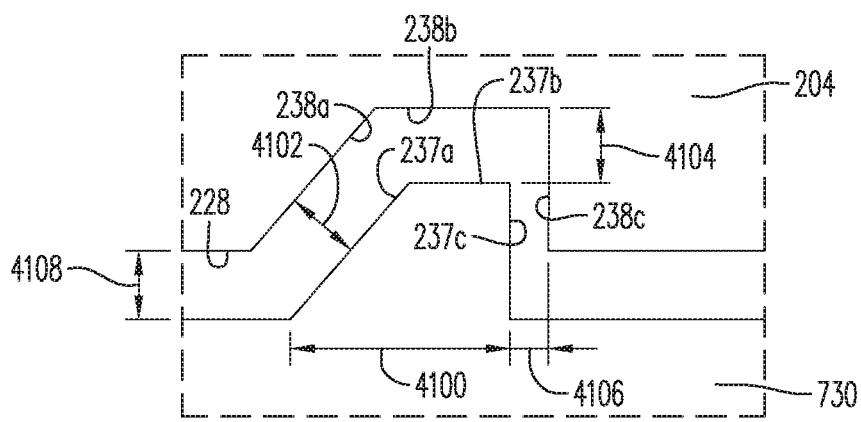
FIG. 41 is a partial cross-sectional view of the inner cap of FIG. 31 within the dashed portion of FIG. 34 referenced as DET-B.

Referring to FIG. 41, protrusions 236, 246 have a width 4100 of 2.9 mm. Distance 4102 of 1 mm is between ramp side 237a and ramp side 238a. Distance 4104 of 1 mm is between flat top 237b and flat top 238b. Distance 4106 of 0.4 mm is between vertical side 237c and vertical side 238c. Distance 4108 of 0.9 mm is between skirt edge 228 and tamper evident band 730 adjacent protrusions 236, 246.

Figure 42:
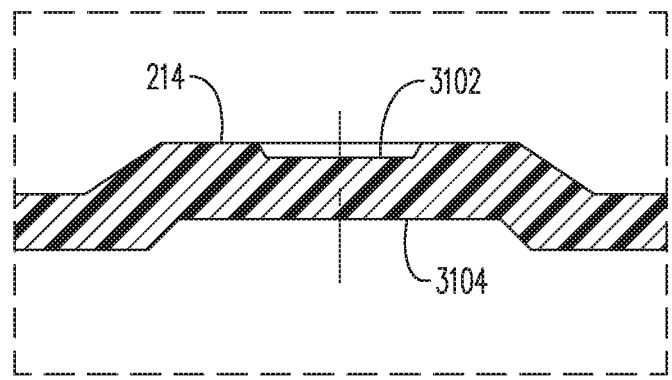
FIG. 42 is a partial cross-sectional view of the inner cap of FIG. 31 within the dashed portion of FIG. 37 referenced as DET-A.

Referring to FIG. 42, protuberance 214 has outer depression 3102 and inner depression 3104. Outer depression 3102 and inner depression 3104 are functional design features that allow for ease of molding (consistent wall thickness) and provide a height required for the two piece child resistant closure of cap assembly 100 to function.

Figure 30:
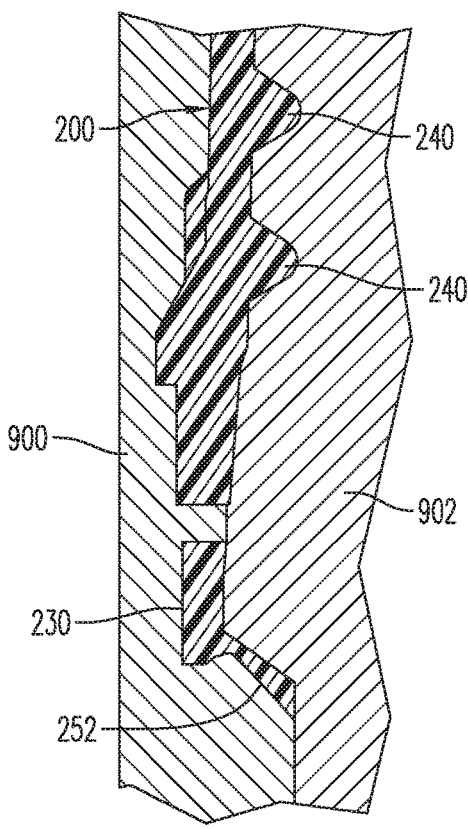
FIG. 30 is a partial cross-sectional view of the inner cap of FIG. 1 during molding.

Referring to FIG. 30, inner cap 200 is molded between a mold 900 and a core 902. Mold 900 has the shape of the outside of inner cap 200. Core 902 has the shape of the inside of inner cap 200. More preferably, core 902 has the shape of the inside of inner cap 200 except without separations 244 and without gap 250 or outer depressions 750, 1350 and inner depressions 751, 1351. Material for inner cap 200 is positioned between mold 900 and core 902 and heat is applied as is known in the art of molding to form inner cap 200.

More preferably, material for inner cap 200 is positioned between mold 900 and core 902 and heat is applied, again as known in the art of molding to form the shape of the inside of inner cap 200. However, inner cap 220 does not have separations 24, and gap 250 or outer depressions 750, 1350 and inner depressions 751, 1351. Separations 24, gap 250, outer depressions 750, 1350 and inner depressions 751, 1351 are then formed by moving sliding thread interrupters that are the shape of separations 244 against core 902 through tamper evident band 230, 730 to form (1) gap 250, or (2) outer depressions 750, 1350 and inner depressions 751, 1351 and (3) through threads 240 forming separations 244. Then, the sliding thread interrupters are withdrawn. The sliding thread interrupters do not contact or deform bridges 232 because, as shown for example in FIGS. 25 and 37, bridges 232 do not extend beyond inner surface 242. Also, a size of inner cap 200 is larger at bridges 232 than at separations 244 and gap 250 or at outer depressions 750, 1350 and inner depressions 751, 1351, as shown for example by dashed line 1360 in FIG. 37. After withdrawal of the sliding thread interrupters, outer depressions 750, 1350 and inner depressions 751, 1351 can have an aperture therethrough, or material can fill in any aperture. To remove inner cap 200, mold 900 can be a split mold so that two halves are removed from inner cap 200. Core 902 can be removed from inner cap 200 by moving inner cap 200 upward and off of core 902 using a stripper plate so that inner cap 200 undergoes a temporary, elastic deformation in the nature of a circumferential expansion to permit inner cap 200 to become disengaged from the core 902. However, as inner cap 200 clears the top of core 902, the resilient nature of the material causes inner cap 200 to assume its original, molded shape. Inner caps 700, 3100 are similarly molded as inner cap 200 described herein.

When thread 240 does not have separations 244, upon removal of core 902, inner cap 200 is "bumped off" using a stripper plate action. One quality issue with this type of molded product is if thread 240 does not have separations 244, thread 240 tends to roll. This action, for example, can strip off core 902 and, thus, create flat spots in thread 240, or creases thread 240, or strips thread 240 off inner cap skirt 204. However, in the present disclosure, thread 240 does have separations 244 and, therefore, allows for greater cooling and less stress on the thread section to provide a better thread profile. In addition, since separations 244 allow for a more flexible material above bridges 232, less stress is applied to bridges 232 upon removal of inner cap 200 from core 902 to prevent weakening of bridges 232 and thereby reducing or eliminating the tamper evident band 230, 730 from breaking away from the rest of the cap during manufacture of cap assembly 100, and, in particular, during connection of inner cap 200, 700, 3100 to a container, for example, container 400.

Thread 240 has equally spaced separations 244. Thread 240 has an even number of separations 244. Preferably, thread 240 has six to ten separations 244, and most preferable eight to ten separations 244. It has been found that less than eight separations 244 can cause tamper evident band 230, 730 to fail and disconnect from the remainder of inner cap 200, 700, 3100 upon application when outer cap 300 is connected to the inner cap 200, 700, 3100, or detachment of tamper evident band 230, 730 from inner cap 200, 700, 3100 when inner cap 200, 700, 3100 is connected to container 400, or both. Separations 244 form 90 degree angles in thread 240. If separations 244 are not aligned with gap 250 between fingers 252, tamper evident band 230 can fail and disconnect from the remainder of inner cap 200 upon application when outer cap 300 is connected to the inner cap 200, or detachment of tamper evident band 230, 730 from inner cap 200, 700 when inner cap 200, 700 is connected to container 400, or both. Similarly, if separations 244 are not aligned with inner depressions 751, 1351, tamper evident band 730 can fail and disconnect from the remainder of inner cap 700, 3100 upon application when outer cap 300 is connected to the inner cap 200, 700, 3100, or detachment of tamper evident band 230, 730 from inner cap 200, 700, 3100 when inner cap 200, 700, 3100 is connected to container 400, or both. Significantly, inner depressions 751, 1351 also allow tamper evident band 730 to cool faster than a tamper evident band without inner depressions 751.

Normal protrusion and cutouts can be prone to quality problems caused by bridges 232 breaking on application when outer cap 300 is connected to the inner cap 200, 700, 3100, or detachment of tamper evident band 230, 730 from inner cap 200, 700, 3100 when inner cap 200, 700, 3100 is connected to container 400, or both. However, protrusion 236, 246 and cutout 238, 248 reduce the stress points on bridges 232 by each bridge 232 or protrusions 236, 246 aligning with one separation 244 in thread 240. Advantageously, aligning each bridge 232 with a separation 244 in thread 240 allows separations 244 to be formed without the sliding thread interrupters contacting or deforming bridges 232. Instead, thread interrupters slide over bridges 232 so that no stress is applied to bridges 232 to prevent weakening of bridges 232 and thus reduce or eliminate the tamper evident band 230, 730 from breaking away from the rest of the cap assembly during manufacture of cap assembly 100, and, in particular, during connection of inner cap 200, 700, 3100 to a container, for example, container 400.

Inner cap 200, 700, 3100 can be made of High Density Polyethylene ("HDPE"). Outer cap 300 can be made of a single material, for example, Polypropylene (PP). Liner 500 can be made of Polyethylene. PP and HDPE would be prime materials typically used for injection molding of closures and would comply with legislation for plastics and articles in contact with food (Food and Drug Administration ("FDA") compliant). Polypropylene and High Density Polyethylene for use in cap assembly 100 is made available, for example, by Ineos, Exxon Mobil Corporation, and Sabic.

PP recommended for use, for example, has the following properties: Form: Melt Flow Rate 230° C./2.16 Kg ISO 1133-1 25 g/10 min, Flexural Modulus 23° C. ISO 178 1800 MPa, Tensile Strength at Yield 23° C. ISO 527-1, -2 38 MPa, Izod Impact Strength, notched 23° C. ISO 180/A 3.3 kJ/m2, Charpy Impact Strength, notched 23° C. ISO 179-1/1 eA 2.3 kJ/m2, Heat Deflection Temperature 0.45 MPa ISO 75-2 120° C., Vicat Softening Temperature 10N ISO306/A50 155° C., or form: Granule, Pellet, Melting Point: 140° C. (284° F.)-170° C. (338° F.), Density: 890 kg/m3 (7.43 lbs/gal, 0.89 kg/dm3)-920 kg/m3 (7.68 lbs/gal, 0.92 kg/dm3), or Tensile Stress, yield, 5 mm/min, 23 MPa ISO 527, Tensile Strain, break, 5 mm/min 19.6% ISO 527, Tensile Modulus, 1 mm/min 1300 MPa ISO 527, Flexural Stress, yield, 2 mm/min 40 MPa ISO 178, Flexural Modulus, 2 mm/min 1600 MPa ISO 178, Izod Impact, unnotched 80*10*4+23° C. 15 kJ/m² ISO 180/1U, Izod Impact, notched 80*10*4+23° C. 4 kJ/m² ISO 180/1A, coefficient of thermal expansion ("CTE"), 23° C. to 60° C., flow 1.28E-04 1/° C. ISO 11359-2, CTE, 23° C. to 60° C., xflow 1.35E-04 1/° C. ISO 11359-2, HDT/Bf, 0.45 MPa Flatw 80*10*4 sp=64 mm 114° C. ISO 75/Bf, HDT/Af, 1.8 MPa Flatw 80*10*4 sp=64 mm 68° C. ISO 75/Af, Mold Shrinkage, flow (5) 2%, Density 1.19 g/cm³ ISO 1183, Drying Temperature 80° C., Drying Time 4 hrs, Melt Temperature 225-250° C., Front—Zone 3 Temperature 240-250° C., Middle—Zone 2 Temperature 215-225° C., Rear—Zone 1 Temperature 195-205° C., Mold Temperature 30-50° C., Back Pressure 0.2-0.3 MPa, Screw Speed 30-60 rpm.

HDPE recommended for use, for example, has the following properties: Melt Flow Rate 190° C./2.16 Kg ISO 1133-1 18 g/10 min, Density ISO 1872-1 23° C. ISO 1183-1 952 kg/m³, Tensile Modulus 23° C., 1 mm/min ISO 527-2 1200 MPa, Tensile strength at yield 23° C., 50 mm/min ISO 527-2 26 MPa, Charpy Impact Strength, notched 23° C. ISO 179-1/1eA 3.0 kJ/m², Environmental Stress Cracking, Resistance (ESCR), 23° C. ASTM 1693 10 h, or form: Powder, Granule, Pellet, relative Density: 0.94-0.97, Bulk Density: 0.4 g/cc at 20° C.-1 g/cc at 20° C., Density (at 20° C.): 940 kg/m³ (7.84 lbs/gal, 0.94 kg/dm³)-970 kg/m³ (8.09 lbs/gal, 0.97 kg/dm³), Melting Point: 120° C. (248° F.)-140° C. (284° F.), Molecular Weight: >25000, or Tensile Stress, yield 24 MPa ASTM D 638, Tensile Strain, yield 7.4% ASTM D 638, Flexural Stress 23 MPa ASTM D 790, Flexural Modulus 10680 MPa ASTM D 790, Izod Impact, unnotched, 23° C. NB J/m ASTM D 4812, Izod Impact, notched, 23° C. 45 J/m ASTM D 256, HDT, 1.82 MPa, 3.2 mm, unannealed 42° C. ASTM D 648, Density 0.932 g/cm³ ASTM D 792, Mold Shrinkage, flow, 24 hrs (5) 2.4% ASTM D 955, Mold Shrinkage, xflow, 24 hrs (5) 1.6% ASTM D 955, Wear Factor Washer 24 10^-10 in ^5-min/ft-lb-hr ASTM D 3702 Modified: Manual, Dynamic COF 0.13-ASTM D 3702 Modified: Manual, Static COF 0.11-ASTM D 3702 Modified: Manual, Drying Temperature 80° C., Drying Time 4 hrs, Melt Temperature 230° C., Front—Zone 3 Temperature 220-230° C., Middle—Zone 2 Temperature 210-220° C., Rear—Zone 1 Temperature 195-205° C., Mold Temperature 40-55° C., Back Pressure 0.2-0.3 MPa, Screw Speed 30-60 rpm Source GMD.

Advantageously, the alignment of each bridge 232 with a separate one of each separation 244 in thread 240 allows inner cap 200, 700, 3100 including tamper evident band 230, 730 to be made of a single material. Further, this alignment allows tamper evident band 230, 730 to be positioned below inner cap skirt 204. This structure reduces or eliminates tamper evident band 230, 730 from breaking away from the rest of cap assembly 100 during manufacture of the cap assembly 100. Further advantageously, this alignment of each bridge 232 with a separate one of each separation 244 reduces or eliminates the tamper evident band 230, 730 from breaking away from the rest of cap assembly 100 during connection of inner cap 200, 700, 3100 to container 400 in virtually 100 percent of inner caps 200. Accordingly, the present inner caps 200, 700, 3100 reduce waste over those previously available.

Thus, the present disclosure has, in one embodiment, a cap assembly for a container that comprises an outer cap having an outer cap end wall. The outer cap end wall has an inner surface and an outer cap skirt with an inner surface. The outer cap has first end teeth extending from the inner surface of the outer cap end wall, and has first vertical ratchet teeth on the inner surface of the outer cap skirt. The cap assembly also has an inner cap. The inner cap has an inner cap end wall with an outer edge and an inner cap skirt joined to the outer edge of the inner cap end wall. The inner cap skirt has an inner surface with a thread. The outer cap overly the inner cap and is concentric therewith, with the thread selectively fastens the cap assembly on the container. Also, the thread has a plurality of separations therein. The inner cap end wall has an upper surface and second end teeth extending from the upper surface. The inner cap has second vertical ratchet teeth on an outer surface of the inner cap skirt, wherein the first and second vertical ratchet teeth abut when the outer cap is turned in an application direction to rotate the inner cap and the outer cap together to fasten the inner cap onto the container, wherein the upper surface of the inner cap wall engages the inner surface of the outer cap end wall and spaces in a vertical direction the first and second end teeth from each other and the first vertical ratchet teeth slide over the second vertical ratchet teeth when the outer cap is turned in a removal direction, and wherein when a downward force is applied on the outer cap, the second end teeth on the inner cap engage with the first end teeth on the outer cap to apply torque on the outer cap in the removal direction turning the inner cap in the removal direction to release the cap assembly from the container.

The inner cap can have a tamper evident band connected to the inner cap skirt.

The tamper evident band can be on a side opposite the inner cap end wall

The tamper evident band can have a plurality of gaps forming a finger between two adjacent gaps.

Each of the plurality of gaps can be aligned with one of the plurality of separations in the thread.

The tamper evident band can be connected to the inner cap skirt by a plurality of bridges.

The tamper evident band can have a plurality of spaces.

Each of the plurality of spaces can be formed between two of the plurality of bridges.

At least one of the plurality of bridges can be aligned with one of the plurality of separations in the thread.

The tamper evident band can have a protrusion that fits in a cutout in the inner cap skirt when the tamper evident band is connected to the inner cap skirt.

The tamper evident band can be a continuous band.

The tamper evident band can have a plurality of depressions in the continuous band.

Each of the plurality of depressions can be aligned with one of the plurality of separations in the thread.

It should also be noted that the terms "first", "second", "third", "upper", "lower", and the like can be used herein to modify various elements. These modifiers do not imply a spatial, sequential, or hierarchical order to the modified elements unless specifically stated.

The numerical values provide herein can be about +/− 10% of the value set forth herein.

As used herein "at least one of" is, for example, 2, 3, 4, 5, 6, 7, 8, 9, 10; and/or; 1-10, 2-9, 4-8, 5-6; and/or at least a quarter, half, three quarters, substantially all, all.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A cap assembly for a container comprising:
   an outer cap having an outer cap end wall with an inner surface and an outer cap skirt with an inner surface, the outer cap having first end teeth that extend from the inner surface of the outer cap end wall, the outer cap having first vertical ratchet teeth on the inner surface of the outer cap skirt; and
   an inner cap having an inner cap end wall with an outer edge and an inner cap skirt joined to the outer edge of the inner cap end wall, the inner cap skirt having an inner surface with a thread, the outer cap overlying the inner cap and being concentric therewith, the inner cap end wall having an upper surface and second end teeth extending from the upper surface, the inner cap having second vertical ratchet teeth on an outer surface of the inner cap skirt, the thread fastens the cap assembly on the container, the thread having a plurality of separations therein,
   wherein the inner cap has a tamper evidence band connected to the inner cap skirt, the tamper evident band having a plurality of gaps forming a finger between two adjacent gaps, wherein at least one of the plurality of gaps is aligned with one of the plurality of separations in the thread,
   wherein the first and second vertical ratchet teeth abut when the outer cap is turned in a direction to rotate the inner cap and the outer cap together to fasten the inner cap onto the container,
   wherein the upper surface of the inner cap wall engages the inner surface of the outer cap end wall to form spaces in a vertical direction between the first and second end teeth, and wherein the first vertical ratchet teeth slide over the second vertical ratchet teeth when the outer cap is turned in a removal direction; and
   wherein when a downward force is applied on the outer cap, the second end teeth on the inner cap engage with the first end teeth on the outer cap to apply torque on the outer cap in the removal direction to turn the inner cap in the removal direction to release the cap assembly from the container.

2. The cap assembly of claim 1, wherein the tamper evident band is on a side opposite the inner cap end wall.

3. The cap assembly as claimed in claim 1, wherein the tamper evident band is connected to the inner cap skirt by a plurality of bridges.

4. The cap assembly as claimed in claim 1, wherein the tamper evident band has a plurality of spaces.

5. The cap assembly of claim 4, wherein each of the plurality of spaces is formed between two of the plurality of bridges.

6. The cap assembly as claimed in claim 1, wherein the tamper evident band has a protrusion that fits in a cutout in the inner cap skirt when the tamper evident band is connected to the inner cap skirt.

7. The cap assembly as claimed in claim 1, wherein the tamper evident band is a continuous band.

8. The cap assembly of claim 7, wherein the tamper evident band has a plurality of depressions in the continuous band.

9. The cap assembly of claim 8, wherein at least one of the plurality of depressions is aligned with one of the plurality of separations in the thread.

10. The cap assembly of claim 1, wherein the outer cap is made of a single material, the inner cap is made of a different single material, and the tamper evident band is made of the same material as the inner cap.

11. The cap assembly of claim 10, wherein of the cap assembly is connected to a container without the tamper evident band breaking away from the rest of the cap assembly in 100 percent of the cap assemblies manufactured.

12. A cap assembly for a container comprising:
an outer cap having an outer cap end wall, the outer cap end wall having an inner surface and an outer cap skirt with an inner surface, the outer cap having first end teeth extending from the inner surface of the outer cap end wall, the outer cap having first vertical ratchet teeth on the inner surface of the outer cap skirt; and
an inner cap having an inner cap end wall with an outer edge and an inner cap skirt joined to the outer edge of the inner cap end wall, the inner cap skirt having an inner surface with a thread, the outer cap overlying the inner cap and being concentric therewith, the inner cap end wall having an upper surface and second end teeth extending from the upper surface, the inner cap having second vertical ratchet teeth on an outer surface of the inner cap skirt, the inner cap has a tamper evident band connected to the inner cap skirt by a plurality of bridges, the thread fastens the cap assembly on the container, the thread having a plurality of separations therein,
wherein the first and second vertical ratchet teeth abut when the outer cap is turned in a direction to rotate the inner cap and the outer cap together to fasten the inner cap onto the container,
wherein the upper surface of the inner cap wall engages the inner surface of the outer cap end wall and spaces in a vertical direction the first and second end teeth from each other and the first vertical ratchet teeth slide over the second vertical ratchet teeth when the outer cap is turned in a removal direction, and
wherein when a downward force is applied on the outer cap, the second end teeth on the inner cap engage with the first end teeth on the outer cap to apply torque on the outer cap in the removal direction turning the inner cap in the removal direction to release the cap assembly from the container,
wherein at least one of the plurality of bridges is aligned with one of the plurality of separations in the thread.

13. The cap assembly of claim 12, wherein the tamper evident band has a plurality of gaps forming a finger between two adjacent gaps.

14. The cap assembly of claim 13, wherein at least one of the plurality of gaps is aligned with one of the plurality of separations in the thread.

15. The cap assembly of claim 12, wherein the tamper evident band is a continuous band.

16. The cap assembly of claim 15, wherein the tamper evident band has a plurality of depressions in the continuous band, and wherein at least one of the plurality of depressions is aligned with one of the plurality of separations in the thread.

17. The cap assembly of claim 12, wherein the outer cap is made of a single material, the inner cap is made of a different single material, and the tamper evidence band is made of the same material as the inner cap.

18. The cap assembly of claim 17, wherein of the cap assembly is connected to a container without the tamper evident band breaking away from the rest of the cap assembly in 100 percent of the cap assemblies manufactured.

* * * * *